US012748182B2

(12) United States Patent
Kim

(10) Patent No.: US 12,748,182 B2
(45) Date of Patent: Sep. 29, 2026

(54) RADAR SENSOR AND METHOD OF CONTROLLING THE SAME

(71) Applicant: HYUNDAI MOBIS CO., LTD., Seoul (KR)

(72) Inventor: Chul Ki Kim, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 252 days.

(21) Appl. No.: 18/519,338

(22) Filed: Nov. 27, 2023

(65) Prior Publication Data

US 2024/0329197 A1 Oct. 3, 2024

(30) Foreign Application Priority Data

Mar. 31, 2023 (KR) ........................ 10-2023-0042605

(51) Int. Cl.
*G01S 7/35* (2006.01)
*G01S 13/58* (2006.01)

(52) U.S. Cl.
CPC ............ *G01S 7/352* (2013.01); *G01S 13/584* (2013.01)

(58) Field of Classification Search
CPC .... G01S 13/931; G01S 13/343; G01S 13/345; G01S 13/584; G01S 7/352; G01S 7/354
USPC .......................................... 342/175, 109, 70
See application file for complete search history.

(56) References Cited

U.S. PATENT DOCUMENTS 3,720,949 A * 3/1973 Richter ................. G01S 13/343 342/128
4,743,910 A * 5/1988 Hill ....................... G01S 13/584 342/201
5,115,243 A * 5/1992 Perry ...................... G01S 13/87 342/158
5,731,781 A * 3/1998 Reed ..................... G01S 13/931 342/135
5,943,132 A * 8/1999 Erskine ................... G01S 7/352 356/484
6,333,710 B1 * 12/2001 Reiche ................... H01H 1/403 342/175
6,396,338 B1 * 5/2002 Huang ..................... H03D 3/06 375/324
7,019,683 B2 * 3/2006 Stevens ................... G01S 13/56 342/134
7,724,182 B2 * 5/2010 Inoue .................... G01S 7/4004 342/172
7,812,761 B2 * 10/2010 Shirakawa ............ G01S 13/584 342/115
8,350,754 B2 * 1/2013 Li .......................... G01R 23/15 356/28.5
9,618,611 B2 * 4/2017 Karlapalem ............ G01S 13/08
9,715,006 B2 * 7/2017 Ebling .................... G01S 7/038
10,422,856 B2 * 9/2019 Cheung ................... G01S 7/352

(Continued)

*Primary Examiner* — Michael W Justice
(74) *Attorney, Agent, or Firm* — MORGAN, LEWIS & BOCKIUS LLP

(57) ABSTRACT

A radar sensor is disclosed. The radar sensor includes a signal generator configured to emit a chirp signal to a target through a transmitting antenna, a waiting loop configured to delay the chirp signal by a predetermined delay time, thereby generating a reference signal, and a frequency mixer configured to receive, as a received chirp signal, the chirp signal reflected from the target through a receiving antenna and to mix the reference signal and the received chirp signal with each other, thereby calculating a beat frequency.

8 Claims, 6 Drawing Sheets

(56) References Cited

U.S. PATENT DOCUMENTS 10,921,436 B2 * 2/2021 Jansen .................... G01S 7/352
10,955,547 B2 * 3/2021 Ray .......................... G01S 7/003
11,428,805 B2 * 8/2022 Kishigami .............. G01S 13/42
11,513,187 B2 * 11/2022 Stettiner ............... G01S 7/2883
11,614,531 B2 * 3/2023 Wu ....................... G01S 13/449 342/149
11,681,039 B2 * 6/2023 You ......................... G01S 7/282 342/70
12,072,421 B2 * 8/2024 Crouch ................. G01S 13/343
12,123,970 B2 * 10/2024 Wu ....................... G01S 13/284
12,146,949 B2 * 11/2024 Jácome ................. G01S 13/931
2006/0066471 A1 * 3/2006 Li ........................... G01S 7/021 342/52
2006/0220943 A1 * 10/2006 Schlick ................... G01S 13/06 342/84
2007/0194976 A1 * 8/2007 Reed ....................... G01S 7/411 342/188
2008/0252513 A1 * 10/2008 Inoue .................... G01S 7/4004 342/175
2008/0316090 A1 * 12/2008 Shirakawa ............ G01S 13/325 342/195
2010/0207806 A1 * 8/2010 Takahashi ............... G01S 13/18 342/109
2015/0219751 A1 * 8/2015 Ebling .................... G01S 13/40 342/175
2016/0084952 A1 * 3/2016 Karlapalem ............ G01S 13/08 342/118
2018/0329031 A1 * 11/2018 Cheung .................. G01S 13/34
2019/0361113 A1 * 11/2019 Ray ......................... H03D 3/009
2020/0049812 A1 * 2/2020 Jansen .................. G01S 13/343
2021/0156982 A1 * 5/2021 Stettiner ................... G01S 7/35
2021/0270962 A1 * 9/2021 You ....................... G01S 13/931
2022/0099837 A1 * 3/2022 Crouch ................. G01S 13/931
2022/0171049 A1 * 6/2022 Wu ......................... G01S 13/34
2023/0095228 A1 * 3/2023 Wu ....................... G01S 13/284 342/112

* cited by examiner

RADAR SENSOR AND METHOD OF CONTROLLING THE SAME

CROSS-REFERENCE TO RELATED APPLICATION

This application claims the benefit of Korean Patent Application No. 10-2023-0042605 filed on Mar. 31, 2023 in the Korean Intellectual Property Office, the disclosure of which is incorporated herein by reference.

BACKGROUND OF THE INVENTION

1. Field of the Invention

The present invention relates to a radar sensor configured to measure a distance to a target and a velocity of the target, and a method of controlling the same.

2. Description of the Related Art

Recently, a frequency-modulated continuous wave (FMCW) radar has been actively researched as a sensor for measuring a distance to a target and a velocity of the target in an urban air mobility (UAM) apparatus, an advanced driving assistance system (ADAS), etc.

Generally, such a FMCW radar is configured to continuously emit a chirp pulse signal to a desired target, and then to mix a chirp pulse signal reflected from the target with a signal coupled in the FMCW radar, thereby generating a beat frequency. In this case, the FMCW radar may obtain information about the distance to the target and the velocity of the target based on the beat frequency.

However, there may be great differences in results of measurement of beat frequencies in accordance with a distance to a target detected by the FMCW radar. For example, a decrease in resolution and an increase in noise level may occur as the distance to the target increases.

The above matters disclosed in this section are merely for enhancement of understanding of the general background of the invention and should not be taken as an acknowledgement or any form of suggestion that the matters form the related art already known to a person skilled in the art.

SUMMARY OF THE INVENTION

Therefore, the present invention has been made in view of the above problems, and it is an object of the present invention to stabilize a resolution and a noise level in detection of a target irrespective of a distance to the target by adjusting delay of a chirp signal to be applied to the target when a beat frequency is generated based on the chirp signal and a received chirp signal reflected from the target.

Objects of the present invention are not limited to the above-described objects, and other objects of the present invention not yet described will be more clearly understood by those skilled in the art from the following detailed description.

In accordance with an aspect of the present invention, the above and other objects can be accomplished by the provision of a radar sensor including a signal generator configured to emit a chirp signal to a target through a transmitting antenna, a waiting loop configured to delay the chirp signal by a predetermined delay time, thereby generating a reference signal, and a frequency mixer configured to receive, as a received chirp signal, the chirp signal reflected from the target through a receiving antenna and to mix the reference signal and the received chirp signal with each other, thereby calculating a beat frequency.

The predetermined delay time may be varied in accordance with an interest detection range for the target.

The interest detection range may be set to a first range when the detection range corresponds to a long range mode. The interest detection range may be set to a second range shorter than the first range when the detection range mode corresponds to a middle range mode. The interest detection range may be set to a third range shorter than the second range when the detection range mode corresponds to a short range mode.

The predetermined delay time may correspond to a time obtained by dividing a distance corresponding to two times the interest detection range by the speed of light.

The signal generator may output the chirp signal at a pulse repetition interval.

The radar sensor may further include a controller configured to control a speed estimation range for the target by adjusting the predetermined delay time and the pulse repetition interval.

The radar sensor may further include a low-pass filter connected to an output terminal of the frequency mixer and configured to filter out components of the beat frequency corresponding to a frequency band equal to or higher than a predetermined frequency.

In accordance with another aspect of the present invention, there is provided a method of controlling a radar sensor, including emitting a chirp signal to a target through a transmitting antenna, delaying the chirp signal by a predetermined delay time, thereby generating a reference signal, receiving, as a received chirp signal, the chirp signal reflected from the target through a receiving antenna, and mixing the reference signal and the received chirp signal with each other, thereby calculating a beat frequency.

The method may further include varying the predetermined delay time in accordance with an interest detection range for the target.

The emitting a chirp signal may include outputting the chirp signal at a pulse repetition interval.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
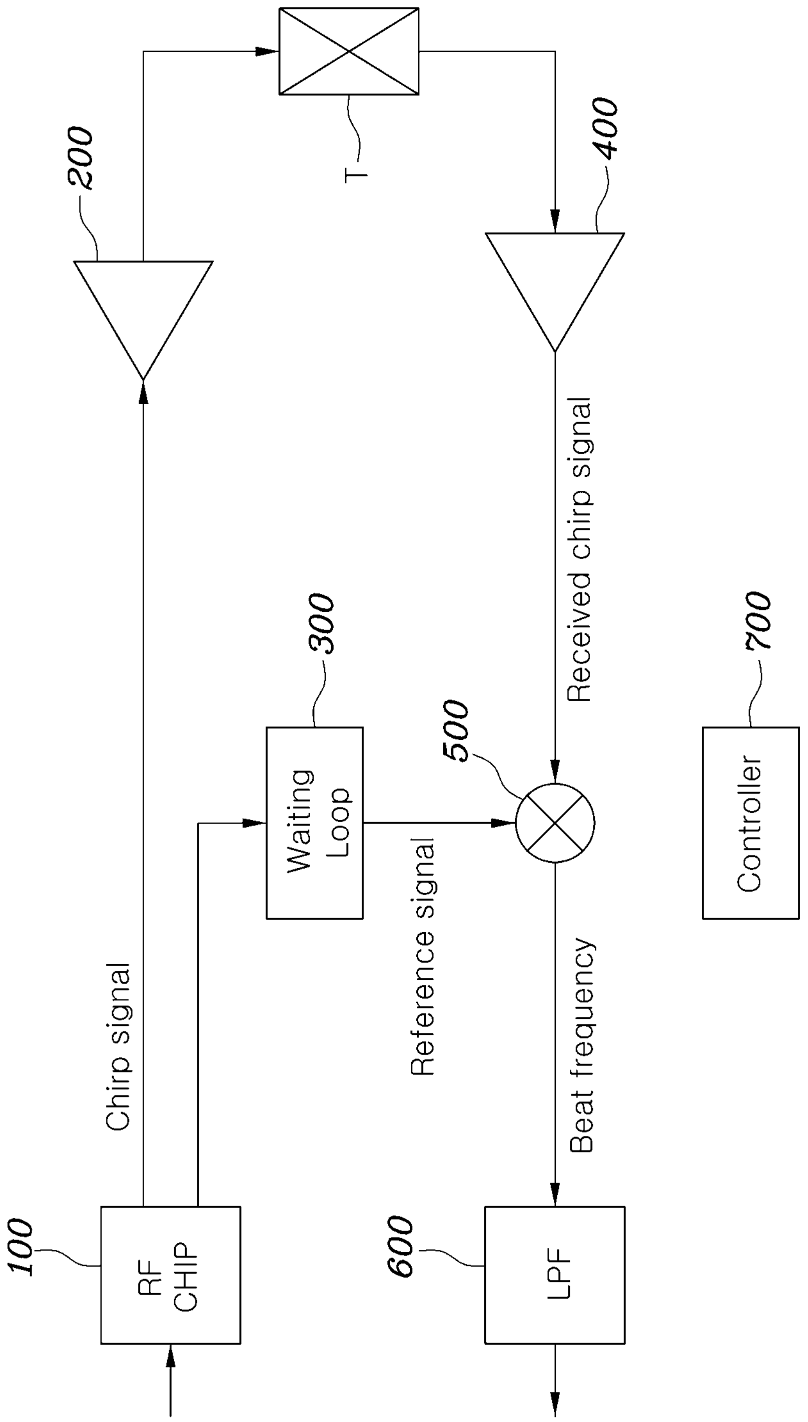
FIG. 1 is a diagram showing a configuration of a radar sensor according to an embodiment of the present invention.

Hereinafter, preferred embodiments of the present invention will be described in detail with reference to the accompanying drawings, and the same or similar elements are designated by the same reference numerals regardless of the numerals in the drawings and redundant description thereof will be omitted.

In describing the present invention, moreover, a detailed description will be omitted when a specific description of publicly known technologies to which the invention pertains is judged to obscure the gist of the present invention. In addition, it should be noted that the accompanying drawings are merely illustrated to easily explain the spirit of the invention, and therefore, should not be construed as limiting the spirit of the invention to the accompanying drawings. On the contrary, the invention is to cover all modifications, equivalents, and alternatives falling within the spirit and scope of the invention as defined by the claims.

Although terms including an ordinal number, such as first or second, may be used to describe a variety of constituent elements, the constituent elements are not limited to the terms, and the terms are used only for the purpose of discriminating one constituent element from other constituent elements.

Unless clearly used otherwise, singular expressions include a plural meaning.

It will be further understood that the terms “comprises” and/or “comprising,” or “includes” and/or “including” when used in this specification, specify the presence of stated features, regions, integers, steps, operations, elements, and/or combinations thereof, but do not preclude the presence or addition of one or more other features, regions, integers, steps, operations, elements, components, and/or combinations thereof.

In addition, the term “unit” or “control unit” used in specific terminology such as a motor control unit (MCU) or the like is only a term widely used for designation of a controller for controlling a particular function of a vehicle and, as such, does not mean a generic functional unit. For example, the controller may include a communication device configured to communicate with another controller or a sensor for control of a function to be performed thereby, a memory configured to store an operating system, logic commands, input/output information, etc., and at least one processor configured to execute discrimination, calculation, determination, etc. required for control of the function to be performed.

FIG. 1 is a diagram showing a configuration of a radar sensor according to an embodiment of the present invention.

As shown in FIG. 1, the radar sensor according to the embodiment of the present invention may include a signal generator (RF CHIP) 100, a transmitting antenna 200, a waiting loop 300, a receiving antenna 400, a frequency mixer 500, a low-pass filter (LPF) 600, and a controller 700.

This embodiment proposes stabilization of a resolution and a noise level in detection of a target irrespective of a distance to the target by adjusting delay of a chirp signal to be applied to the target when a beat frequency is generated based on the chirp signal and a received chirp signal reflected from the target.

The signal generator 100 may emit a chirp signal to a target T through the transmitting antenna 200. In this case, the signal generator 100 may output the chirp signal at a pulse repetition interval.

The waiting loop 300 may delay the chirp signal by a predetermined delay time $\tau$, thereby generating a reference signal.

In this case, the predetermined delay time $\tau$ may be varied in accordance with an interest detection range R for the target T. In more detail, the predetermined delay time $\tau$ may be increased as the interest detection range R increases, and may correspond to a time obtained by dividing a distance corresponding to two times the interest detection range R by the speed of light (c), as expressed by the following Expression 1. When a detection range mode corresponds to a long range mode, the interest detection range R is set to a first range. When the detection range mode corresponds to a middle range mode, the interest detection range R is set to a second range shorter than the first range. On the other hand, when the detection range mode corresponds to a short range mode, the interest detection range R is set to a third range shorter than the second range.

$$T = 2 * R/c \qquad \text{Expression 1}$$

The frequency mixer 500 may receive, as a received chirp signal, the chirp signal reflected from the target T through the receiving antenna 400, and may mix the reference signal and the received chirp signal with each other, thereby calculating a beat frequency.

The low-pass filter 600 may be connected to an output terminal of the frequency mixer 500, and may perform filtering to filter out a beat frequency corresponding to a frequency band equal to or higher than a predetermined frequency.

The controller 700 may control a speed estimation range for the target T by adjusting the predetermined delay time and the pulse repetition interval. In more detail, the controller 700 may vary a range in which the radar sensor estimates a velocity of the target T, which moves, by adjusting the predetermined delay time and/or the pulse repetition interval. According to an exemplary embodiment of the present disclosure, the controller 700 may include a processor (e.g., computer, microprocessor, CPU, ASIC, circuitry, logic circuits, etc.) and an associated non-transitory memory storing software instructions which, when executed by the processor, provides the functionalities of the controller 700. Herein, the memory and the processor may be implemented as separate semiconductor circuits. Alternatively, the memory and the processor may be implemented as a single integrated semiconductor circuit. The processor may embody one or more processor(s).

Figure 2A:
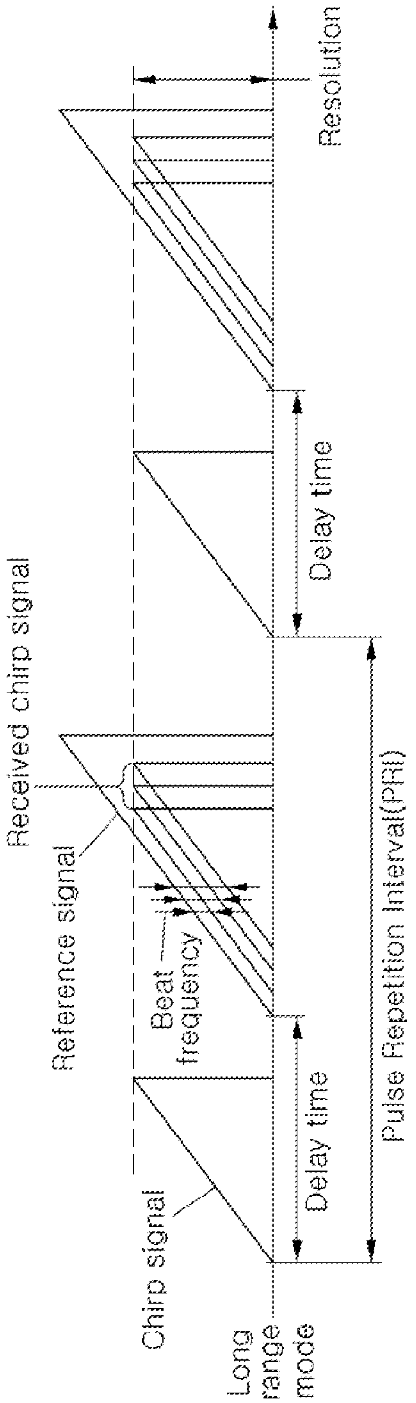
FIGS. 2A and 2B are diagrams explaining a procedure of calculating a beat frequency in the radar sensor according to the embodiment of the present invention.
Figure 2B:
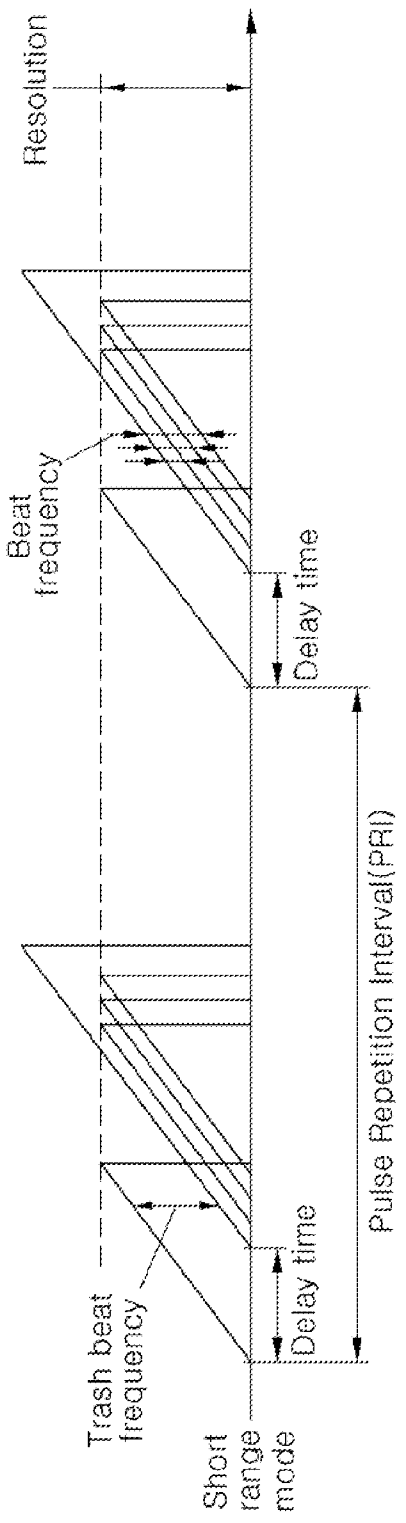

FIGS. 2A and 2B are diagrams explaining a procedure of calculating a beat frequency in the radar sensor according to the embodiment of the present invention.

FIGS. 2A and 2B show procedures of calculating beat frequencies in the radar sensor when the detection range mode is set to a long range mode and when the detection range mode is set to a short range mode, respectively.

A chirp signal may be output at a pulse repetition interval.

In both the long range mode and the short range mode, a reference signal may be delayed by a predetermined delay time, as compared to the chirp signal. In this case, the predetermined delay time may be set to be longer in the long range mode than in the short range mode. In this embodiment, slopes (that is, chirp rates) of the chirp signal and the reference signal may be set to be equal.

The beat frequency may be calculated based on the reference signal and a received chirp signal. The radar sensor according to this embodiment may calculate a beat frequency based on a predetermined delay time and, as such, may achieve an increase in resolution and an increase in signal-to-noise ratio (SNR), as compared to the case in which there is no delay time.

Meanwhile, in the short range mode, the chirp signal and the reference signal may partially overlap each other because the delay time in the short range mode is shorter than that in the long range mode and, as such, a trash beat frequency may be generated. This will be described later in detail with reference to FIGS. 3A and 3B.

Figure 3A:
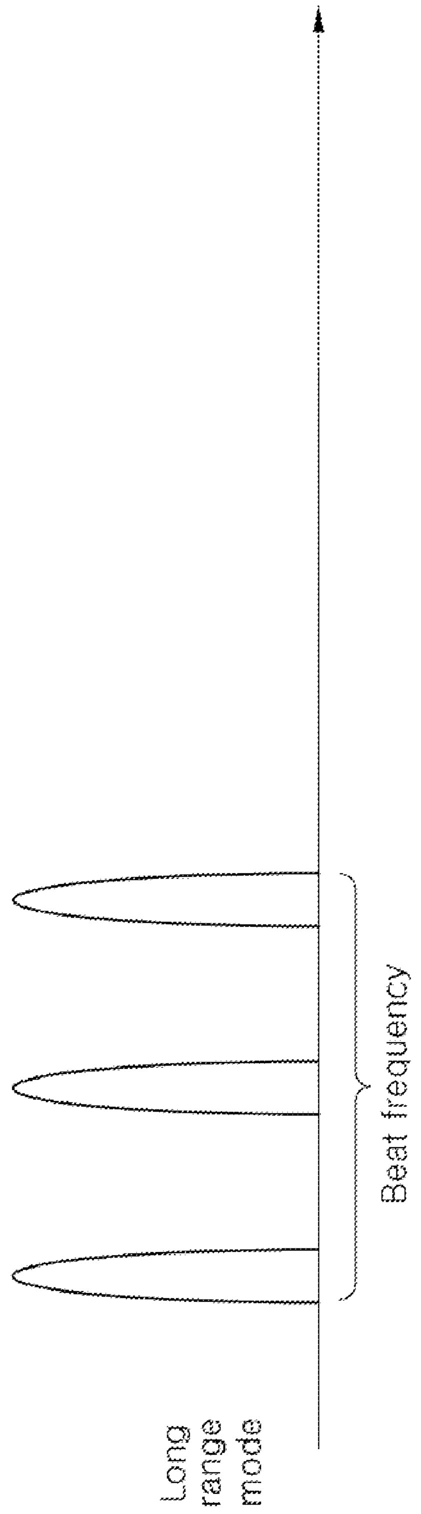
FIGS. 3A and 3B are diagrams explaining a form of a beat frequency calculated in the radar sensor according to the embodiment of the present invention.
Figure 3B:
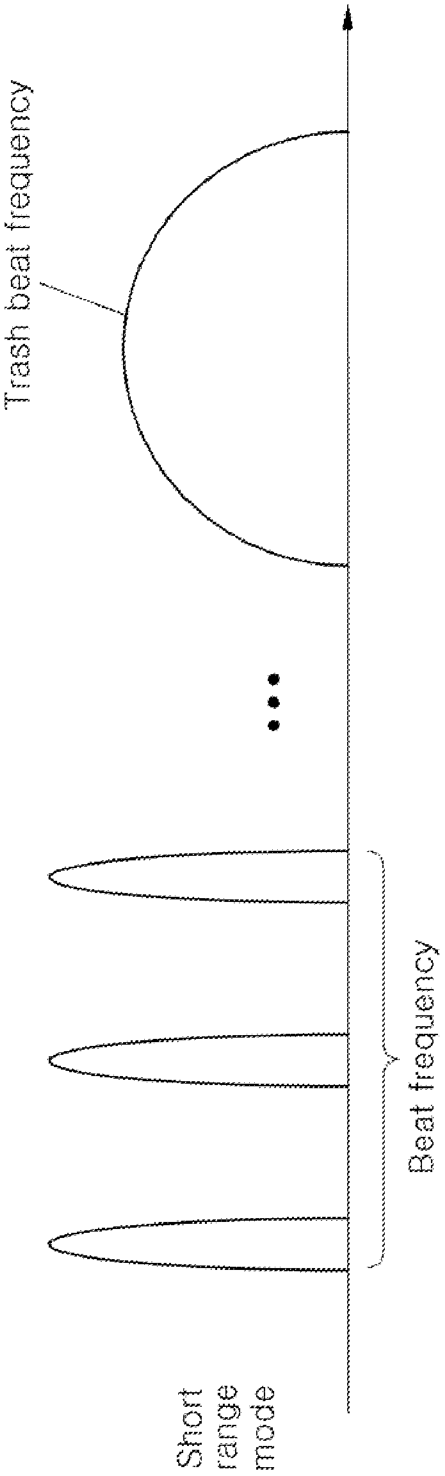

FIGS. 3A and 3B are diagrams explaining a form of a beat frequency calculated in the radar sensor according to the embodiment of the present invention.

FIGS. 3A and 3B show forms of beat frequencies when the detection range mode is set to the long range mode and when the detection range mode is set to the short range mode, respectively.

In the short range mode, a trash beat frequency may be generated, as described with reference to FIGS. 2A and 2B, differently from the long range mode. In this case, the trash beat frequency may be filtered out using the low-pass filter 600 (FIG. 1) because the trash beat frequency has a higher frequency band than that of the beat frequency which corresponds to a low frequency band.

Figure 4:
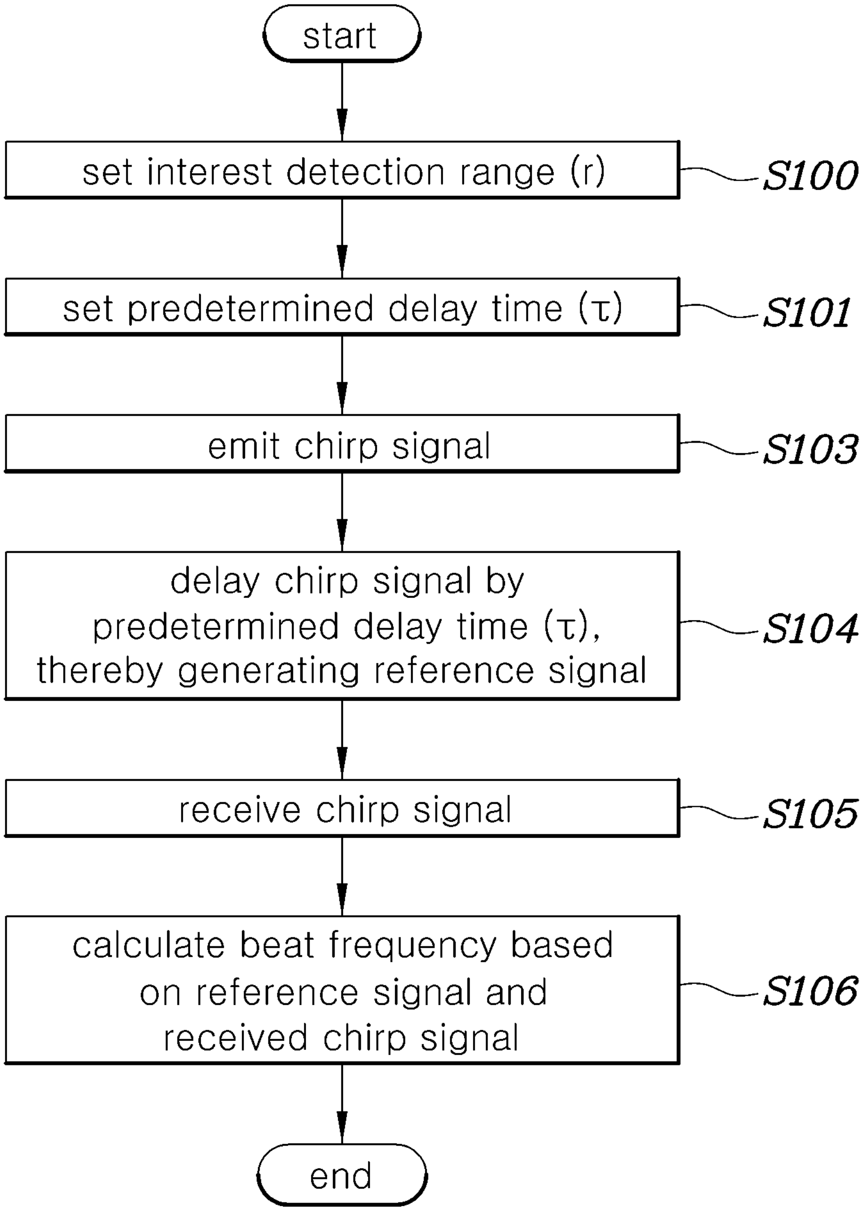
FIG. 4 is a flowchart explaining a method of controlling the radar sensor according to the embodiment of the present invention.

FIG. 4 is a flowchart explaining a method of controlling the radar sensor according to the embodiment of the present invention.

Referring to FIG. 4, an interest detection range R may be set in accordance with the detection range mode as described above (S101). In this case, a predetermined delay time $\tau$ may be varied in accordance with the interest detection range R for a target. The predetermined delay time $\tau$ may be set to a time obtained by dividing a distance corresponding to two times the interest detection range R by the speed of light (c) (S102).

The signal generator 100 may emit a chirp signal to a target T at a pulse repetition interval through the transmitting antenna 200 (S103). The waiting loop 300 may delay the chirp signal by the predetermined delay time $\tau$, thereby generating a reference signal (S104).

In this case, the receiving antenna 400 receives the chirp signal reflected from the target T (S105). The frequency mixer 500 may mix the reference signal and the received chirp signal with each other, thereby calculating a beat frequency (S106).

Meanwhile, the present invention as described above may be embodied as computer-readable code, which can be written on a program-stored recording medium. The recording medium that can be read by a computer includes all kinds of recording media, on which data that can be read by a computer system is written. Examples of recording media that can be read by a computer may include a hard disk drive (HDD), a solid state drive (SSD), a silicon disk drive (SDD), a read only memory (ROM), a random access memory (RAM), a CD-ROM, a magnetic tape, a floppy disk, an optical data storage, etc. Accordingly, the above detailed description should not be construed as restrictive in all respects but as exemplary. The scope of the present invention should be determined by a reasonable interpretation of the appended claims, and all modifications within the equivalent scope of the present invention are included in the scope of the present invention.

In accordance with the present invention, it may be possible to stabilize a resolution and a noise level in detection of a target irrespective of a distance to the target by adjusting delay of a chirp signal to be applied to the target when a beat frequency is generated based on the chirp signal and a received chirp signal reflected from the target.

The effects of the embodiments of the present invention are not limited to the above-described effects and other effects which are not described herein may be readily understood by those skilled in the art from the above description.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A radar sensor comprising:

a signal generator configured to emit a chirp signal to a target through a transmitting antenna;

a waiting loop configured to delay the chirp signal by a predetermined delay time, thereby generating a reference signal, wherein the predetermined delay time is varied according to an interest detection range for the target and is set longer for a long range mode than for a short range mode;

a frequency mixer configured to receive, as a received chirp signal, the chirp signal reflected from the target through a receiving antenna and to mix the reference signal and the received chirp signal with each other, thereby calculating a beat frequency;

a low-pass filter connected to an output of the frequency mixer and configured to filter out a high frequency beat signal generated due to partial overlap of the reference signal and the received chirp signal in the short range mode; and a controller configured to adjust the predetermined delay time and a pulse repetition interval of the chirp signal before mixing the reference signal and the received chirp signal based on the interest detection range for the target and control a speed estimation range for the target.

2. The radar sensor according to claim 1, wherein:

the interest detection range is set to a first range when the interest detection range corresponds to the long range mode;

the interest detection range is set to a second range shorter than the first range when the interest detection range corresponds to a middle range mode; and the interest detection range is set to a third range shorter than the second range when the interest detection range corresponds to the short range mode.

3. The radar sensor according to claim 1, wherein the predetermined delay time corresponds to a time obtained by dividing a distance corresponding to two times the interest detection range by a speed of light.

4. The radar sensor according to claim 1, wherein the signal generator outputs the chirp signal at the pulse repetition interval.

5. A method of controlling a radar sensor, comprising:

emitting a chirp signal to a target through a transmitting antenna;

delaying the chirp signal by a predetermined delay time, thereby generating a reference signal, wherein the predetermined delay time is varied according to an interest detection range for the target and is set longer for a long range mode than for a short range mode;

receiving, as a received chirp signal, the chirp signal reflected from the target through a receiving antenna; and mixing the reference signal and the received chirp signal with each other, thereby calculating a beat frequency; and filtering out a high frequency beat signal generated due to partial overlap of the reference signal and the received chirp signal in the short range mode, the method further comprising:

adjusting the predetermined delay time and a pulse repetition interval for the chirp signal before mixing the reference signal and the received chirp signal based on the interest detection range for the target and controlling a speed estimation range for the target.

6. The method according to claim 5, wherein the emitting a chirp signal comprises outputting the chirp signal at the pulse repetition interval.

7. The method according to claim 5, wherein:

the interest detection range is set to a first range when the interest detection range corresponds to the long range mode;

the interest detection range is set to a second range shorter than the first range when the interest detection range corresponds to a middle range mode; and the interest detection range is set to a third range shorter than the second range when the interest detection range corresponds to the short range mode.

8. The radar sensor according to claim 5, wherein the predetermined delay time corresponds to a time obtained by dividing a distance corresponding to two times the interest detection range by a speed of light.

* * * * *